Sept. 15, 1942. H. N. RENTON 2,295,689
WINDOW CONSTRUCTION
Filed June 1, 1940 8 Sheets-Sheet 1
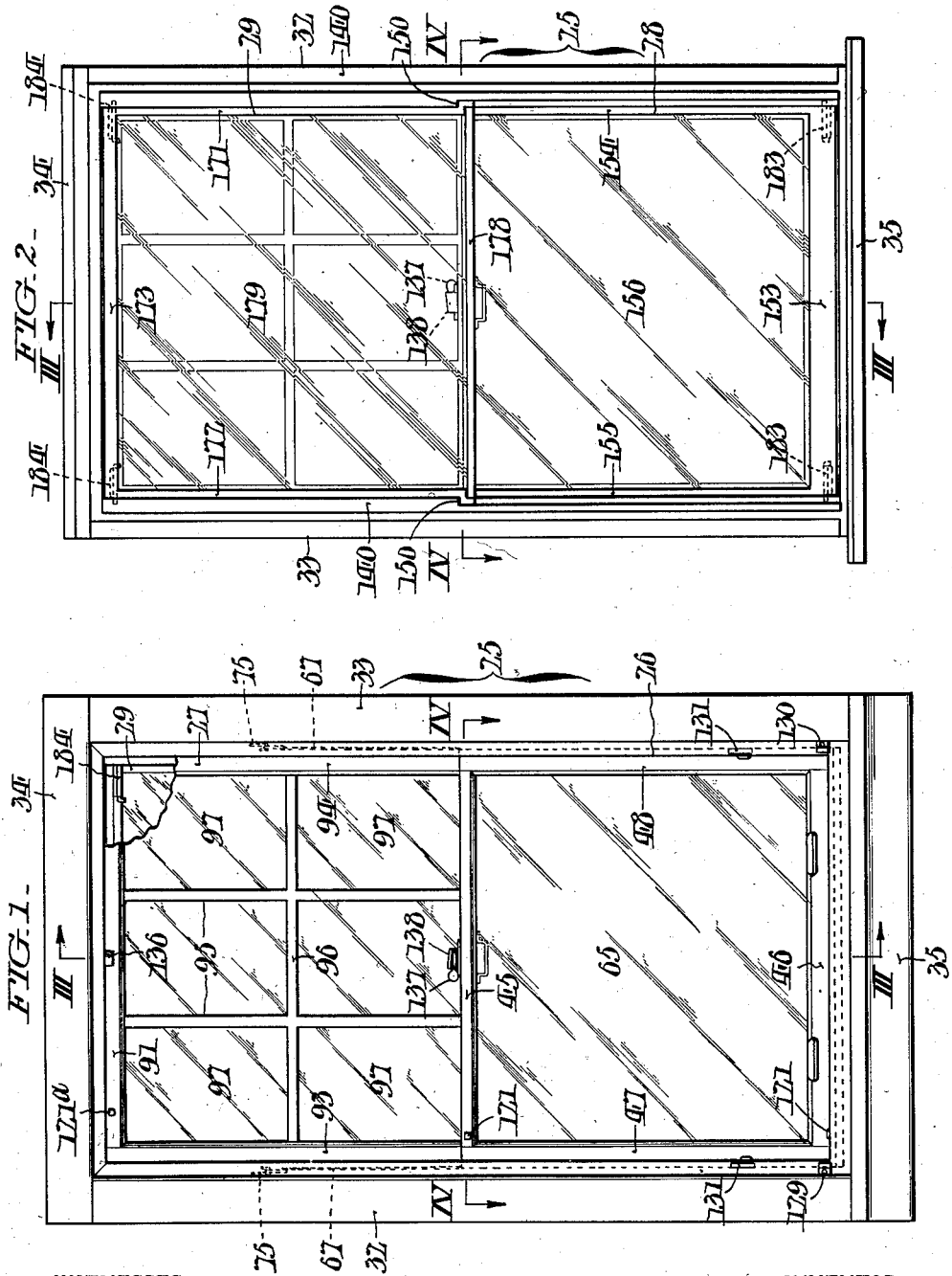
INVENTOR:
Henry N. Renton,
BY Paul & Paul
ATTORNEYS.

Sept. 15, 1942.  H. N. RENTON  2,295,689
WINDOW CONSTRUCTION
Filed June 1, 1940  8 Sheets-Sheet 2
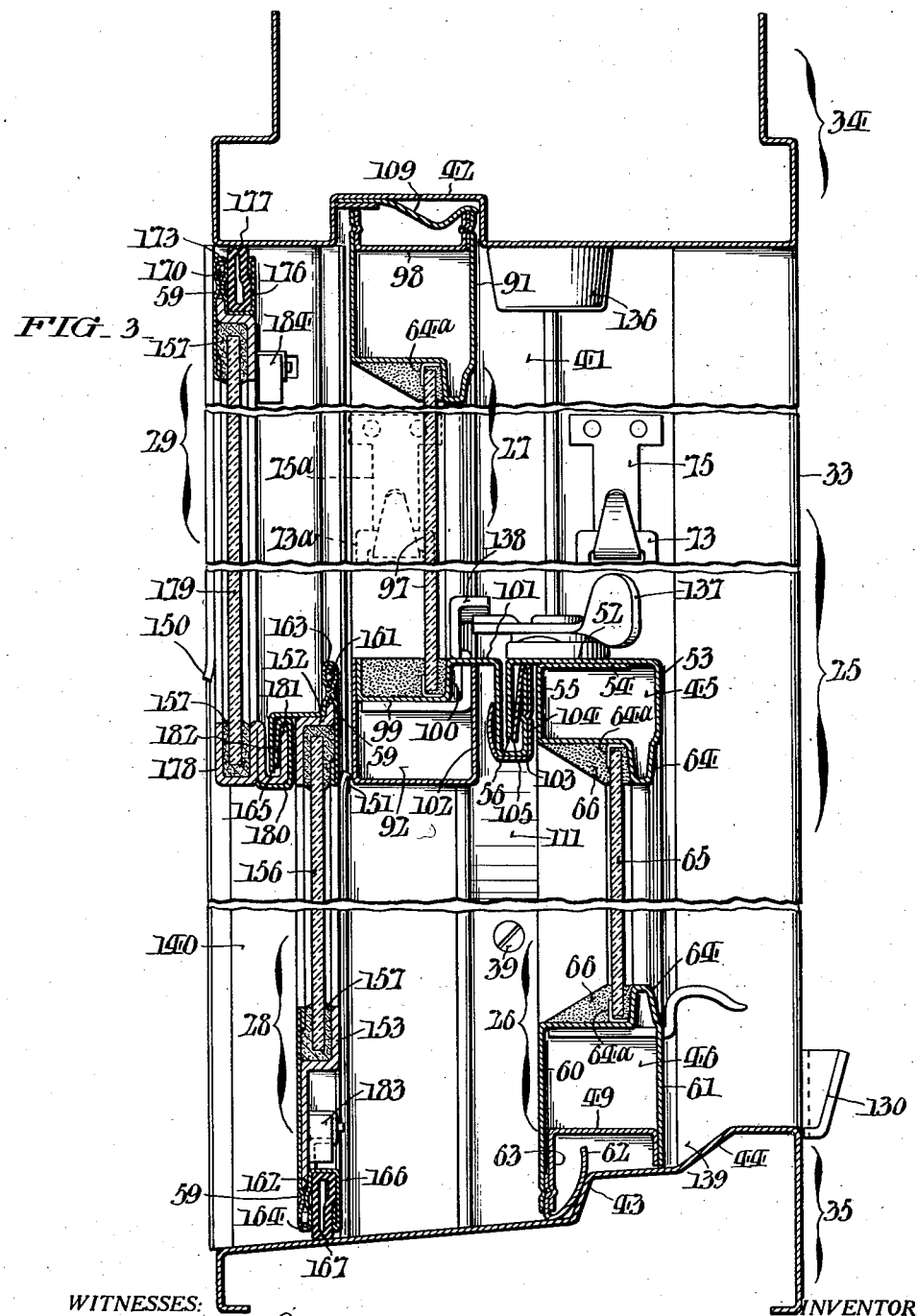
WITNESSES:
INVENTOR:
Henry N. Renton,
BY
ATTORNEYS.

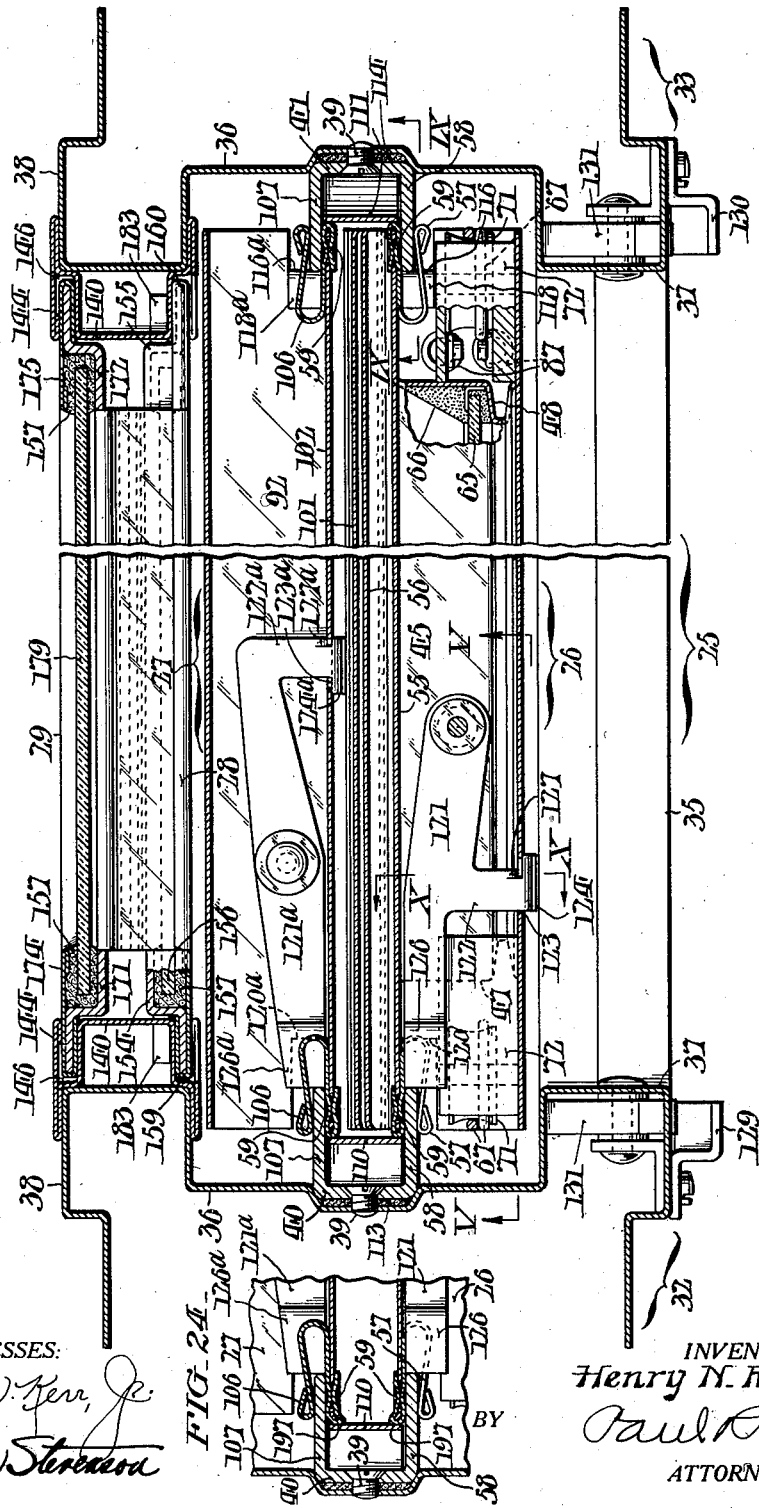

Sept. 15, 1942.  H. N. RENTON  2,295,689
WINDOW CONSTRUCTION
Filed June 1, 1940    8 Sheets-Sheet 4
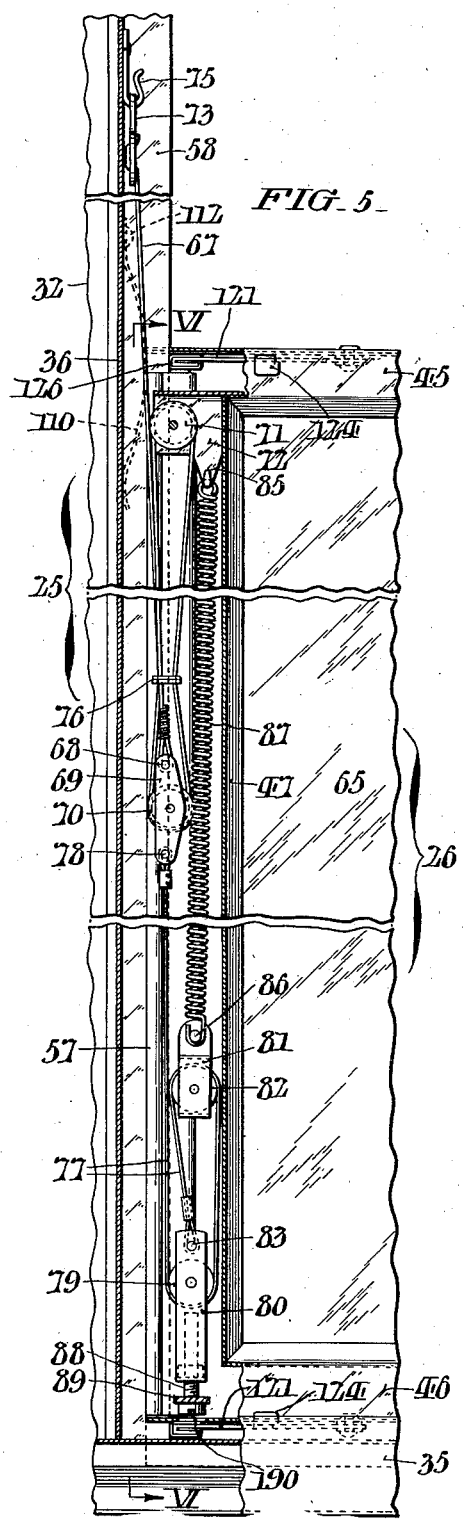
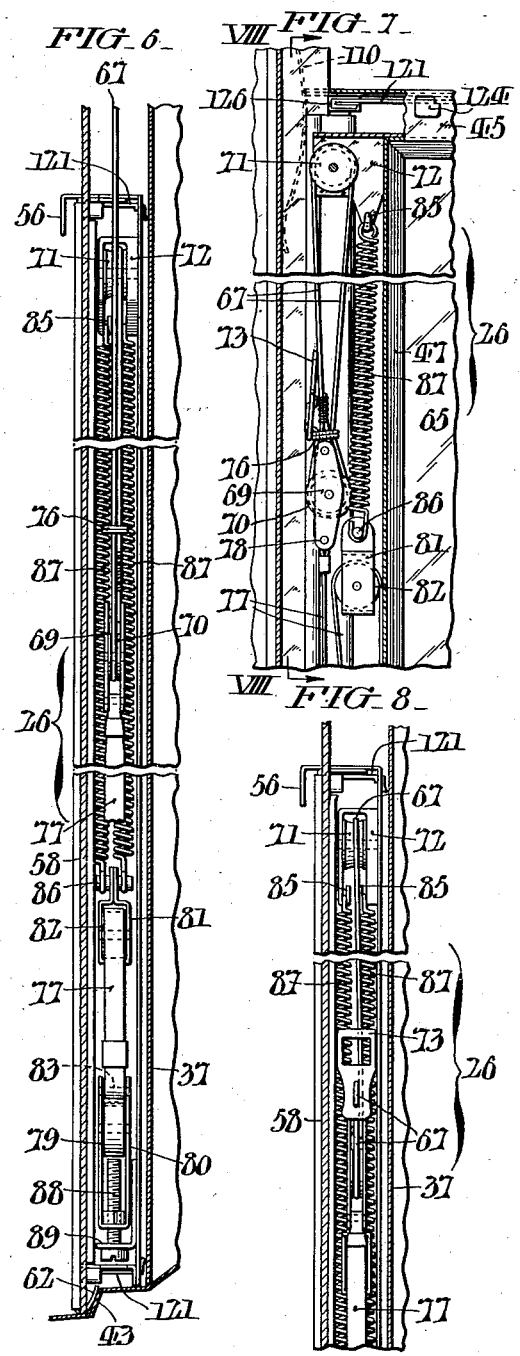
INVENTOR:
Henry N. Renton,
BY Paul & Paul
ATTORNEYS.

Sept. 15, 1942.  H. N. RENTON  2,295,689
WINDOW CONSTRUCTION
Filed June 1, 1940   8 Sheets-Sheet 5

WITNESSES:
Thomas W. Kerr, Jr.
Woodrow Steward

INVENTOR:
Henry N. Renton,
BY  Paul & Paul
ATTORNEYS.

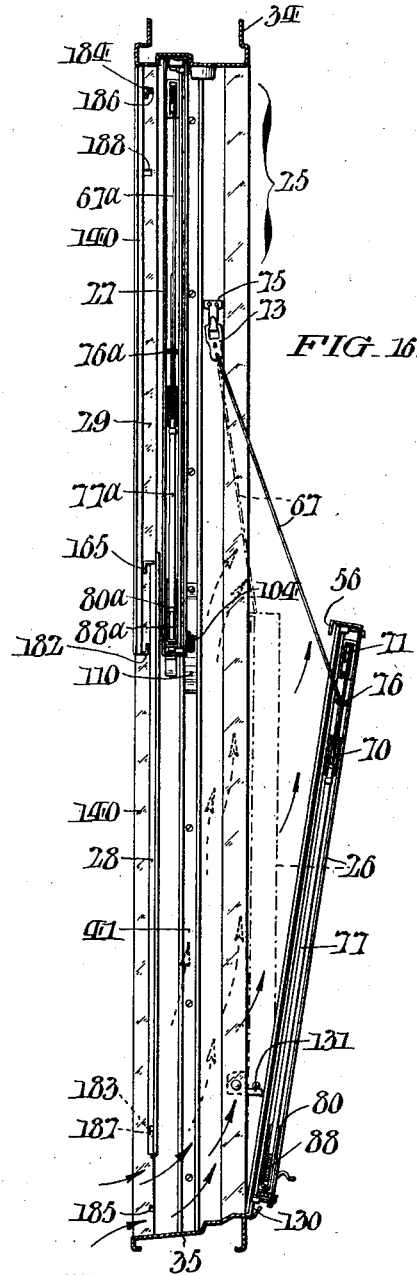
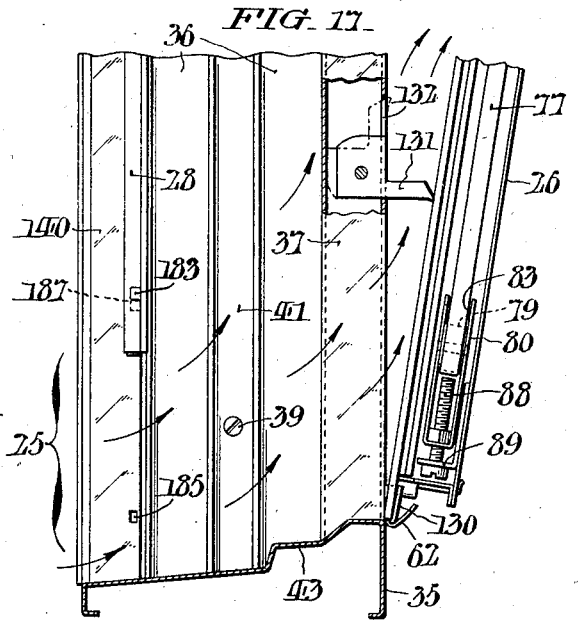
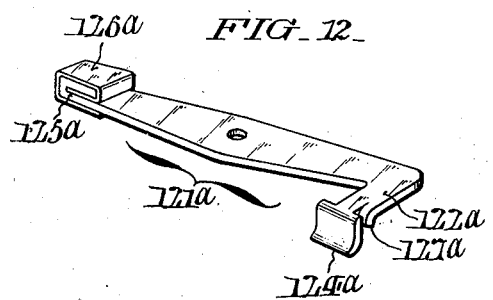
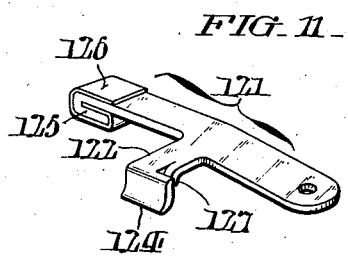

Sept. 15, 1942.   H. N. RENTON   2,295,689
WINDOW CONSTRUCTION
Filed June 1, 1940   8 Sheets-Sheet 7
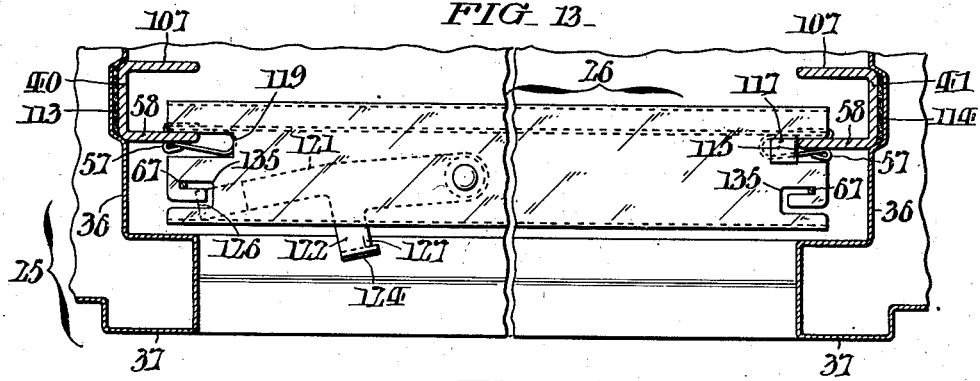
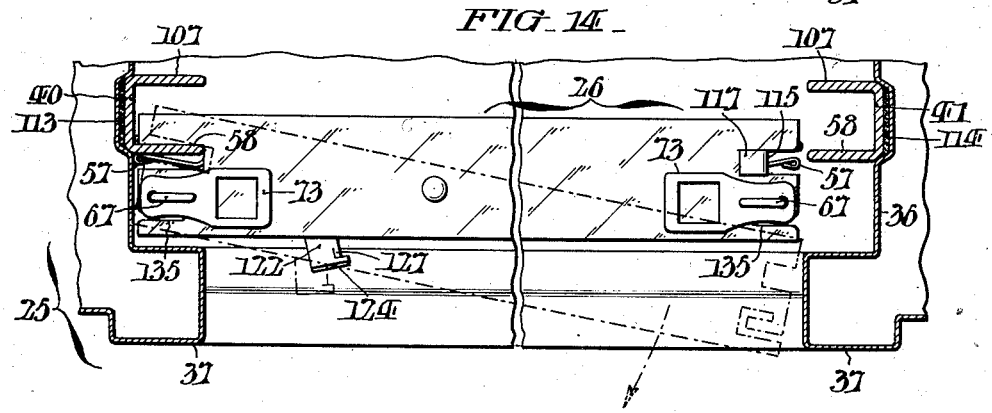
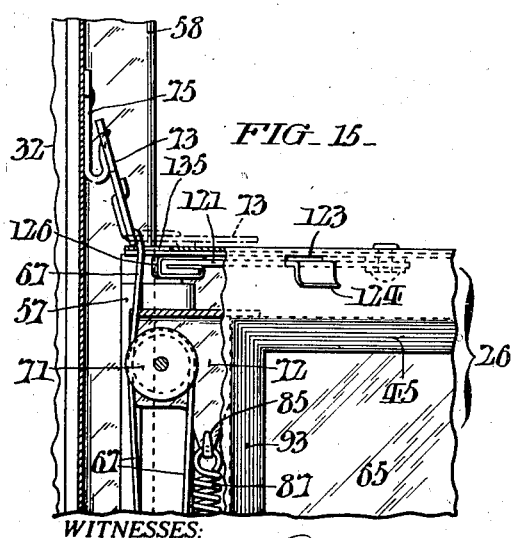
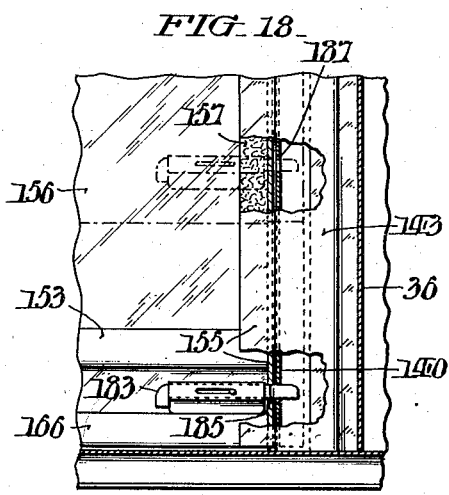
INVENTOR:
Henry N. Renton,
BY
ATTORNEYS.

Sept. 15, 1942.  H. N. RENTON  2,295,689
WINDOW CONSTRUCTION
Filed June 1, 1940  8 Sheets—Sheet 8
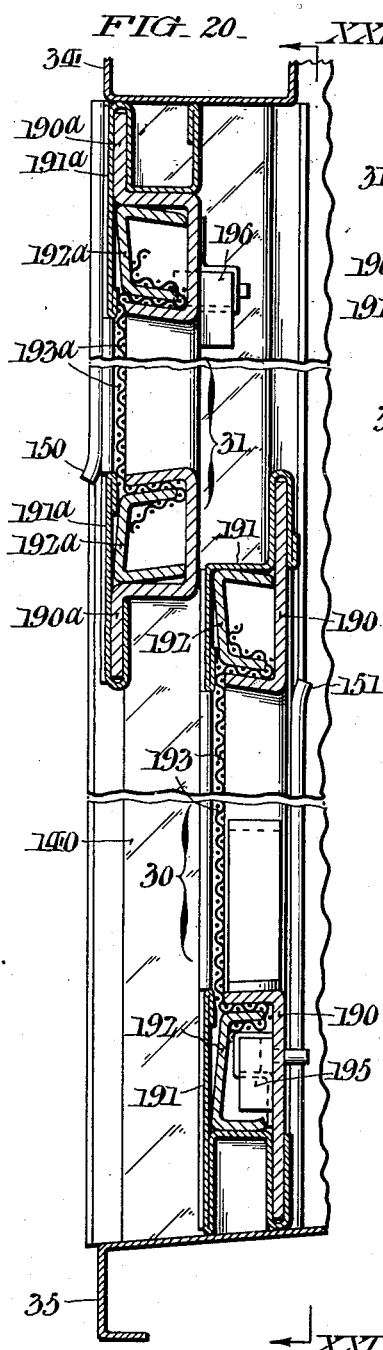
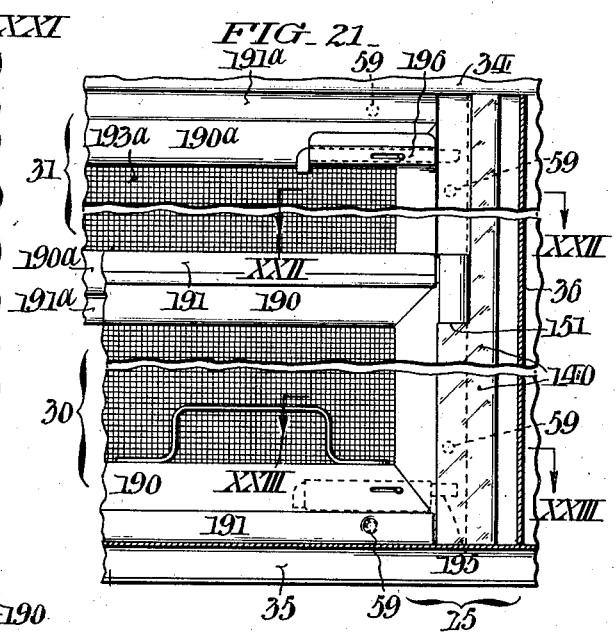
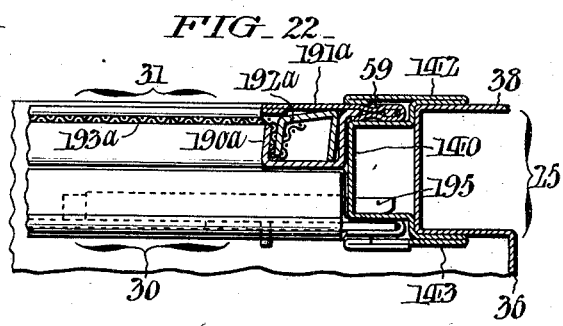
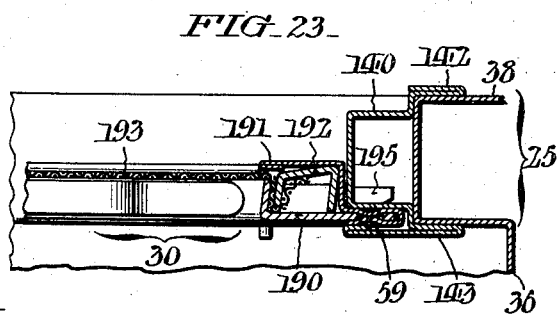
WITNESSES:
INVENTOR:
Henry N. Renton,
BY
ATTORNEYS.

Patented Sept. 15, 1942

2,295,689

UNITED STATES PATENT OFFICE 2,295,689

WINDOW CONSTRUCTION

Henry N. Renton, Wyncote, Pa., assignor to The American Pulley Company, Philadelphia, Pa., a corporation of Pennsylvania Application June 1, 1940, Serial No. 338,416

8 Claims. (Cl. 189—72)

This invention relates to window construction, and has reference more particularly to metallic windows of the sliding sash type.

Amongst the objects of my invention are to make it possible to fabricate such windows economically and expeditiously; and to provide for the obvious advantages of the cleaning, repairing, glazing and painting; to obtain maximum ventilation, and for protection of sash during installation, or for passage of large objects through the opening; to permit painting of the entire area of the sash, and to prevent the sash from becoming paint-stuck.

Another aim of my invention is to attain the above advantages in a window in which the sash suspension and balancing means are incorporated with the sashes so as to be removable with the latter from the window frame.

Another object of my invention is to make provisions whereby the lower sashes may be displaced inwardly for the purpose of providing draftless ventilation.

Another object of my invention is to provide for the incorporation in the window, of auxiliary mounting means which will allow the ready application or removal of interchangeably usable auxiliary storm sashes or screen sashes.

Another object of my invention is to provide for easy removal and replacement of the panes of the storm sashes and the wire mesh of the screen sashes when necessary.

Another object of my invention is to provide for the effective sealing of the main and auxiliary sashes relative to each other and the window frame and at the same time insure against binding or sticking of the relatively moving contacting surfaces of said sashes and frame.

How the foregoing and other objects may be readily realized in practice will appear from the following detailed description of the attached drawings, whereof Fig. 1 shows, in elevation, the in-side window conveniently embodying my invention.

Fig. 2 shows the out-side elevation of the window with the storm sashes in place.

Fig. 3 is a vertical sectional view drawn to a larger scale and taken as indicated by the angled arrows III—III in Figs. 1 and 2.

Fig. 4 is a horizontal section of the window taken as indicated by the angled arrows IV—IV in Figs. 1 and 2.

Fig. 5 is a fragmentary detail sectional view taken as indicated by the angled arrows V—V in Fig. 4.

Fig. 6 is a fragmentary detail sectional view taken as indicated by the angled arrows VI—VI in Fig. 5.

Fig. 7 is a view like Fig. 5 with the lower sash of the window raised.

Fig. 8 is a fragmentary sectional view taken as indicated by the angled arrows VIII—VIII in Fig. 7.

Figs. 11 and 12 are perspective views of keeper elements respectively associated with the lower and upper sashes of the window.

Fig. 13 is a fragmentary view corresponding to Fig. 4 but with the lower sash in elevation.

Fig. 14 is a view like Fig. 13 with a lower sash made ready for displacement or withdrawal from the window frame.

Fig. 15 is a fragmentary view partly in elevation and partly in section showing one of the steps in the preparation for the displacement or removal of the lower sash.

Fig. 16 is a vertical section corresponding to Fig. 3 showing the lower sash withdrawn from the window frame and arranged for draftless ventilation.

Fig. 17 is a fragmentary view corresponding to Fig. 16 and drawn to a larger scale.

Fig. 18 is a fragmentary view partly in front elevation and partly in section showing the means provided for locking the auxiliary or bottom storm sashes.

Fig. 20 is a view corresponding to Fig. 3 showing screen sashes substituted for the storm sashes shown in the latter figure.

Fig. 21 is a fragmentary view in section taken as indicated by the angle arrows XXI—XXI in Fig. 20.

Figs. 22 and 23 are fragmentary detail views in cross section taken as indicated by the angled arrows XXII—XXII and XXIII—XXIII in Fig. 21; and Fig. 24 is a fragmentary sectional view corresponding to Fig. 4 and showing a modified detail.

Figure 9:
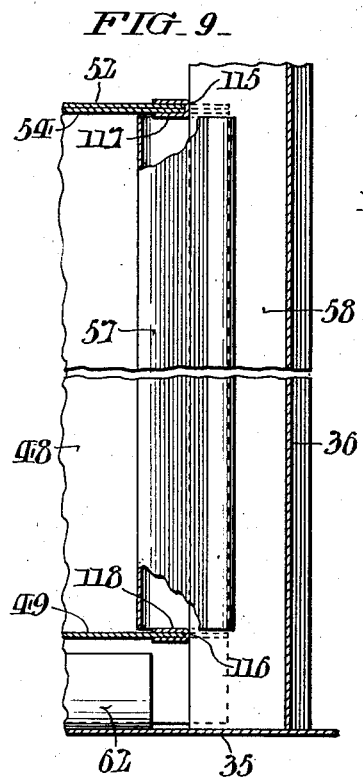
Figs. 9 and 10 are fragmentary detail views taken as indicated by the angled arrows IX—IX and X—X in Fig. 4.

As herein illustrated, my improved window is constructed throughout from sheet metal, and comprises a frame 25, sliding main lower and upper sashes 26, 27 (Figs. 1 and 4), as well as lower and upper sliding auxiliary or storm sashes 28, 29. Sliding lower and upper screen sashes 30, 31 (Figs. 20–23) are also provided, which are interchangeable with said storm sashes 28 and 29. The frame 25 has side portions or jambs 32, 33, a top horizontal connecting member or lintel 34, and a sill 35, all of which parts are fashioned to irregular channel cross sectional configuration from relatively light but stiff sheet metal stock. As shown in Fig. 4, the jambs 32, 33 are longitudinally recessed as at 36 and have box beads 37, 38 at their inner and outer corners. Into the recesses 36 of the jambs 32, 33 extend the vertical edges of the sashes 26, 27; and secured centrally within the recesses 36 by screws 39 are parting strips 40 and 41 which, in practice, are fashioned to channel cross section from relatively stout non-corrosive metal (such as zinc), or from relatively stout sheet metal stock covered with light-gauge, non-corrosive sheet stock and positioned with their side flanges projecting inwardly of the sash opening in the frame 25 for service as tracks or guide rails for the sashes. The frame lintel 34 has an upward recess 42 (Fig. 3) in its bottom wall to receive the top edge of the upper sash 27; while the sill 35 is sloped downwardly and outwardly of the window for drainage purposes, and stepped as at 43 and 44 for a purpose later on explained. The components of the frame 25 are preferably welded together along the regions of mutual contact, but may, if desired be otherwise secured one to another, as for example, by riveting.

The lower sash 26 is shown as being of the single light variety with opposite side, top and bottom rails 45, 46, 47 and 48, fashioned, like the components of the frame 25, from sheet material, and similarly united. The side rails 47, 48 (Fig. 4) and the bottom rail 46 of the sash 26 are of channel section, the side rails being left open, but the bottom rail being closed by an inset channel piece 49. The top rail 45 of the sash 26, on the other hand, is of boxed cross section, and closed at the top through lapping of a horizontal inwardly bent portion 52 (Fig. 3) of its inner wall 53 over upon a horizontal forwardly bent portion 54 of its outer wall 55. As shown, the lapping portion 52 of the inner wall 53 of the top rail 45 is extended beyond the outer wall 55 and then bent downward as at 56 into the form of a weathering flange. The sash 26 is sealed at the sides by weathering strips 57 of light non-corrosive spring metal, which strips, as shown in Fig. 4, are U-shaped in cross section to yieldingly embrace the inner track flanges 58 of the parting strips 40 and 41. As further shown in Fig. 4, the strips 57 are formed along one side with marginal retroversions which frictionally engage over the corresponding outer flanges of the side rails 47, 48, and which are held from displacement by one or more spot indentations such as shown at 59 in Fig. 4. From Fig. 3 it will be noted that the outer wall 60 of the bottom rail 46 is extended downwardly beyond the inner wall 61 so as to overlap the step 43 of the sill 35, and is sealed by a non-corrosive spring weathering strip 62 which is curved for camming action with the shoulder of the said step as the sash is lowered to closed position. As shown, one edge of the strip 62 is secured to the sash 26 between the outer wall 60 of the rail 46 and the corresponding flange 63 of the inset channel 49. The four rails of the sash 26 jointly provide an internal perimetric bead 64 for abutment of the glass pane 65 which is sealed by putty or other plastic composition conventionally indicated at 66. To assist in retaining the glass 65, I have provided lugs or tabs of relatively soft sheet metal such as shown at 64a which are welded fast at their inner ends into the corners of the pane recess of the sash. Initially, these tabs 64a are flat, but upon placement of the pane 65, they are bent up as shown in Fig. 3 to overlap the glass.

The lower sash 26 is hung by counterbalancing suspension means whereof there is one at each side of the window. As instanced in Figs. 5–8, each such suspension means includes a flexible metallic strand element in the form of a cable 67 whereof one end is connected at 68 to the upper end of a yoke 69 which houses a floating pulley 70. From the yoke 69, the cable 67 extends upwardly to an associated pulley 71 which is journalled in a housing 72 fixedly set into the corresponding side rail of the sash 26 at the top. After passing around the pulley 71, the cable 67 extends downward to the floating pulley 70, then around the latter, and finally upward, being provided at its other end with a terminal eye 73 which is adapted to be engaged with an anchorage hook 75 secured within the recess 36 in the jamb 32 of the window frame 25. In the interval between the pulleys 70 and 71, the windings of the cable 67 are embraced by a slip clip 76 which serves for a purpose later described. Each lower sash suspension means further includes a second metallic strand element in the form of a metallic tape 77 whereof one end is connected at 78 to the lower end of the floating pulley yoke 69. From this point of attachment, the tape 77 passes down to a pulley 79 which is journalled in a yoke 80 within the hollow of the side rail of the sash 26 at the bottom. After rounding the pulley 79, the tape 77 passes upward to an associate floating pulley 81 carried by a yoke 82, then around said pulley and downward, the other end of said tape being secured at 83 to the top end of the pulley yoke 80. In tension between end anchorages 85 and 86 respectively on the housing 72 for the pulley 71 and the yoke 81 of the floating pulley 82 is a pair of helical draw springs 87. As the sash 26 is raised, the springs 87 contract to maintain the cable 67 and the tape 77 taut as the floating pulleys 70 and 82 move toward each other in taking up on said cable and tape. The springs 87 of the suspension means respectively at opposite sides of the sash 26 are proportioned to counterbalance the weight of the sash and keep it from displacement in any position to which it may be moved. In order that the tension of the springs 87 may be regulated if found necessary for the proper functioning of the suspension means, the yoke 80 of the lower pulley 79 is in each instance vertically shiftable by means of a headed screw 88 of which the shank passes freely through an angle bracket 89 within the hollow of the bottom rail 46 of the sash 26 and threadedly engages into the bottom of said yoke, the head of said screw being accessible through an opening 90 in the closure strip of said sash rail. It is to be particularly noted that the two units of the sash suspension means are accommodated within the hollows of the side rails of the sash 26.

The upper sash 27 is shown as being of the multi-light type having upper and lower and side rails 91, 92, 93 and 94, as well as vertical muntins 95 and a horizontal muntin 96 by which the sash area is subdivided for the several glass panes 97. The top and side rails 91, 93, 94 of the upper sash 27 are of irregular channel configuration, the side rails being left open, but the top rail being closed by an insert channel piece 98 in a manner similar to the bottom rail of the lower sash. The bottom rail 92 is of regular channel section and reversed in position with relation to the other rails as will be seen from Fig. 3. Inserted into the hollow of the bottom rail 92 from above is a closure strip 99 which is likewise of upright channel section and has its side flange 100 extended inwardly as at 101 to overreach the top of the corresponding side flange 102 of said rail, the extension being bent first downwardly and then upwardly into the form of a trough 103 to receive the pendant flange 56 of the upper rail 45 of the lower sash 26. Embracing the projection 103 of the upper sash 27 is a non-corrosive spring weathering strip 104 which has a free edge portion 105 to frictionally engage the weathering flange 56 on the lower sash when the window is closed. As shown in Fig. 4, the upper sash 27 is sealed at the sides by U-section spring weathering strips 106 like those of the lower sash 26, which strips are affixed to the side rails of said upper sash and which frictionally engage the outer sash-guiding rail or track flanges 107 of the parting strips 40 and 41. At the top, the upper sash is sealed through engagement of the edge of one of its upstanding side wall flanges with the free longitudinally curved edge of a spring weathering strip 109 whereof the other longitudinal edge is suitably fixed within the recess 42 of the frame lintel 34. At the end regions of the meeting rails 45 and 92 of the two sashes 26 and 27, weather seals are maintained by bowed spring tongues 110 and 111 located within the hollows of the parting strips 40 and 41, said springs being secured only at their upper ends by screws 112 so that their lower ends are free to slide against the bottoms of said hollows. As a safe guard against the passage of air or rain between the backs of the parting strips 40 and 41 and the frame jambs 32 and 33, packing material of felt or the like is interposed as shown at 113 and 114 in Figs. 4, 13 and 14.

In order that the lower sash 26 may be readily displaced inwardly from the frame 25 for the purpose of draftless ventilation, or removed altogether for convenience of cleaning it, provisions are made as follows: As shown in Figs. 4 and 9 the top and bottom rails 45, 46 of the lower sash 26 are notched at the right hand side of the window as at 115 and 116 for registry with the guide flange 58 of the parting strip 41, the inner edges of said notches being faced with non-corrosive metal as at 117 and 118 and adapted to bear against the flange edge. At the opposite or left hand side of the sash 26, the rails 45 and 46 are similarly notched as at 119, 120, but these notches are much deeper than the others so that their inner edges clear the edge 58 of the flange of the parting strip 40. Pivoted within the hollows of the top and bottom rails 45 and 46 of the lower sash 26 are keepers in the form of horizontal levers 121 (see Figs. 4, 5 and 11) having lateral manipulating projections 122 which extend outward through slots 123 in the inner walls of said bars, and which are formed with grasps 124. As shown in Fig. 11, the free end of each lever 121 is formed with a retroversion 125 for anchorage of a convolute facing 126 of non-corrosive metal. Normally the levers 121 occupy the position shown in Fig. 4 in which they are held through engagement of lugs 127 on them with the bottom edges of the slots 123 and in which their faced ends 126 bear against the edge of the guide flange 58 of the parting strip 40 to keep the sash centralized in the frame of the window. By slightly lifting the levers 121 to disengage their lugs 127 and then swinging them to the position shown in Fig. 13 so that their ends clear the guide flange 58, the sash 26 may be shifted leftward to the position shown in Fig. 14 so that the notches 115 and 116 at the right hand side clear the flange 58 of the strip 41, whereupon said sash may be swung rearward about its opposite vertical edge as shown in dot and dash lines in Fig. 14, and finally displaced inwardly relative to the frame. Upon such displacement of the sash 25, its lower corners may be rested, as shown in dotted lines in Figs. 16 and 17 in pocketed brackets 129 and 130 secured to the inner faces of the frame jambs 32 and 33 near the bottom while still suspended by the cables 67 when ventilation without draft is desired. At 131 in Figs. 1, 16 and 17 are shown pivoted stops 134 which are normally out of the way within the hollows of the frame jambs 32, 33 as shown in dotted lines in Fig. 17, but which can be swung downwardly through slots 132 in said jambs to the full line position shown in Figs. 16 and 17 to determine an inclined position for the displaced sash 26 for increased ventilation.

At opposite ends of its top, the sash 26 is provided with three-way angular notches 135 into which the suspension cables 67 are adapted to be sprung as shown in Figs. 13 and 15 before the sash is entirely withdrawn from the window frame for the purposes of cleaning. Thus, when the eye tabs 73 are disengaged from the anchorage hooks 75 and the cables are released to the action of the spring take-ups of the balancing means, said cables will be arrested as shown in Fig. 15 when said hooks encounter the top of the sash. Due to the manner of their attachment to the cable ends, the eyes 73 will, under the pull of the cables 67, assume horizontal positions flat against the top of the sash and within the confines of the latter as shown in full lines in Fig. 14 and in dot and dash lines in Fig. 15. If by accident the cables 67 should become dislodged from the notches 135, they will be ultimately arrested by the cable clips 76 as instanced in Figs. 7 and 8, thereby checking further taking up of said cables and preventing disruption or derangement of the sash balancing means. It is to be particularly observed in the latter connection from Figs. 7 and 8, that the eyes 73 assume a vertical position flat against the outer runs of the cables 67 within the open channel hollows of the side rails 47 and 48 of the sash 26 so that they cannot become jammed between the side of the sash edges and the contiguous walls of the recesses 36 in the frame jambs 32 and 33.

The sash balancing and suspension means and other fittings on the upper sash 27 are identical with those of the lower sash 26. Accordingly in order to preclude repetitive description, all corresponding elements of the upper sash balancing and suspension means and other fittings are identified by the same reference numerals previously employed, with addition in each instance, however, of the letter a for readiness of distinction. The upper sash 27 is thus removable from the window frame in exactly the same manner as the lower one. Except for being fulcrumed intermediate their ends, the keepers 121a (Figs. 4 and 12) for the upper sash 27 are like those of the lower sash 26. In preparation for its removal, it is to be understood that the upper sash 27 is moved down, and the lower sash 26 raised so as to be out of the way. A buffer 136 (Figs. 1 and 3) of rubber or the like secured centrally of the under face of the frame lintel 34 serves as a shock absorbing limiting stop for the lower sash when the same is lifted. A suitable latch (Fig. 3) of which the interlocking components 137 and 138 are respectively carried by the meeting rails 53 and 92 of the two sashes 26 and 27, is provided for securing the sashes in closed position.

As shown in Fig. 3, the inner flange 61 of the bottom rail 46 of the lower sash 26 stops short of the top of the sill 35 to permit drainage of any leak water from the trap 139 formed by the step 44 in said sill immediately behind said bottom rail.

Figure 19:
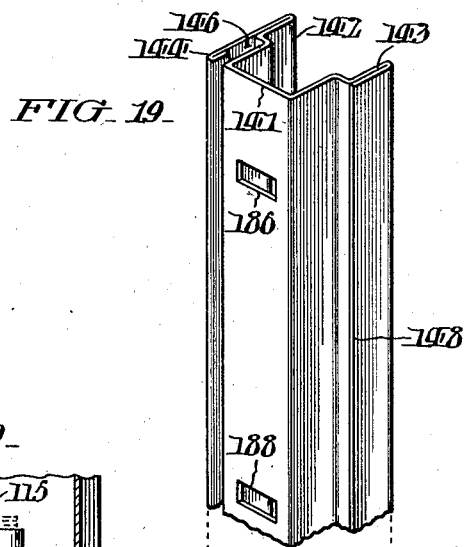
Fig. 19 is a view in broken out perspective of a supplemental frame jamb element forming a part of my improved window structure.
Figure 10:
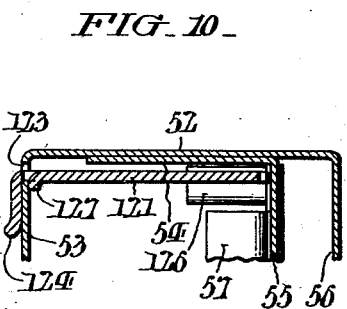

The provisions made for application of the storm sashes 28, 29 or the screen sashes 30, 31 to the window include a pair of supplemental jamb members 140 of irregular channel cross section. One of these members 140 is separately illustrated in Fig. 19, and, as shown, is fashioned from sheet metal like the other parts of the window. The narrow channel portions 141 of the members 140 are dimensioned to engage the beads 38 of the frame jambs 32, 33 with a tight friction fit. The side flanges of each supplemental jamb member 140 are offset outwardly as at 142 and 143 and then retroverted as at 144 and 145 with incidental formation of longitudinal edge slots 146, 147, the upper and lower halves respectively of the retroverted portions 144 and 145 being cut away as at 148 and 149 and the cut ends rounded outwardly of the slots 146 and 147 as at 150 and 151. The rails 152, 153, 154, and 155 of the lower storm sash (see Figs. 3 and 4) are all of Z cross section and welded together, with resultant formation of a depression into which the glass pane 156 is set and sealed with packing 157 of felt or the like. The flanges of the side rails 154, 155 of the lower sash 28 are faced all around with non-corrosive sheet metal as at 159, 160 and engage with a snug fit into the grooves 145 of the supplemental jamb members 140. The flanges 161 and 162 of the top and bottom rails 152 and 153 of the sash 28 are similarly faced as at 163 and 164, the facing 163 being extended outwardly at one side and bent downwardly as at 165, while the facing 164 is so shaped at the bottom as to provide a retaining channel 166 for resilient tubular weathering 167 whereof the projecting portion seals against the top of the window sill 35 as shown in Fig. 3. It will be noted that the facings 159, 160, 163 and 164 are all extended inwardly of the sash area to assist in the retainment of the glass 156, and that they are removably held assembled with the sash frames by spot indentations as instanced at 59 in Fig. 3. Accordingly, the facings 159, 160, 163 and 164 can be readily removed and restored in the event that glass replacement is necessary.

The upper storm sash 29 is constructed along generally similar lines, its top 170 and its side rails 171, 172 being of Z-section and faced with non-corrosive sheet metal as at 173, 174 and 175, and the faced flanges of said side rails extending with a snug fit into the guide grooves 146 of the supplemental jamb members 140 as shown in Fig. 4. The top facing 173 of the upper sash 29 provides a retaining channel 176 (Fig. 3) for resilient tubular weathering 177 whereof the protruding edge seals against the bottom face of the frame lintel 34. The bottom rail 178 of the upper storm sash 29 is cross sectionally shaped like the letter W, providing two channels, one for reception of the lower edge of the glass pane 179 and the other for reception of the dependent flange portions 165 of the facing 163 on the top rail 152 of the lower storm sash 28. As shown in Fig. 3, the facing 180 on the bottom rail 178 of the sash 29 extends around the upstanding inner flange 181 of said rail and has a free spring portion 182 which bears weathertight against the pendant flange portion 165 of the facing 163 on the lower sash 28. The storm sashes 28, 29 are secured in position by retractable slide latches 183, 184 which engage openings 185 and 186 in the supplemental jamb members 140. As instanced in Fig. 18, the supplemental jamb members 140 are provided with additional bolt apertures 187, 188 at levels respectively above and below the apertures 185, 186. Thus when ventilation is desired, the lower storm sash 28 may be secured in the raised position as indicated in dot and dash lines in Fig. 18, or/and the upper sash secured in a lowered position. Due to cutting away of the side flanges of the supplemental jamb members 140 at 148 and 149, it will be apparent that the sashes 28 and 29 can be removed upward and downward respectively out of engagement with the guide grooves 146 and 147 in said members, this action being facilitated by the rounding of said flanges at 150 and 151.

Upon removal of the storm sashes 28 and 29, the screen sashes 30 and 31 can be substituted in their place as shown in Figs. 20–23. The rails 190 of the lower screen 30 are suitably configured cross sectionally to provide, in conjunction with their facings 191 of non-corrosive metal, a perimetric recess for a rectangular wedge clamp frame 192 composed of channel section bars for retaining the screening 193. As was the case with those of the storm sashes, the facings 191 of the lower screen 30 are extended inwardly of the sash area—in this instance, to overlap the wire mesh clamping frame 192, and are moreover held in place by spot indentations as exemplified at 59 in Figs. 22 and 23 so as to be readily removable and replaceable when the mesh requires renewing. The upper screen 31 is substantially identical with the lower screen 30 as will be readily seen from the drawings, and therefore need not be separately described. Latch bolts 195, 196 on the screens 30 and 31 are provided for engaging the same holes in the supplemental jamb members 140 as those used for the bolts 183 and 184 on the storm sashes 28 and 29, to hold said screens in position, as clearly shown in Figs. 21–23.

Fig. 24 shows a modification in which the side edge flanges of the lower main sash 26 of the window are rounded inwardly toward each other as at 197 to preclude the possibility of their becoming caught between the side edges of the meeting rail sealing tongues 110 and the inner faces of the guide flanges 58 and 107 on the parting strip 40 and 41. This modified construction may of course be embodied in the upper main sash 27 also.

Having thus described my invention, I claim:

1. A window structure comprising a frame with sash guide rails at the inner sides of its jambs; a sliding sash recessed at its opposite side edges to engage over the respective guide rails, the recess at one side edge of the sash being deeper than the recess at the opposite side edge so that the sash can be shifted laterally and thereafter maneuvered for removal from within the frame; and retractable elements within hollows of the sash frame normally closing a portion of the deeper side recess of the sash, said means affording a bearing surface for the edge of the corresponding guide rail, while the bottom of the recess at the other side of the sash similarly bears on the edge of the guide rail at that side of the frame.

2. A window structure according to claim 1 in which the retractable elements have the form of levers, whereof one free end normally bears against the guide rail at the corresponding side of the window frame, and the other ends extend outwardly through apertures in the sash frame for convenience of manipulation from the inner side of the window.

3. A window structure according to claim 1, in which each of the retractable elements is in the form of a lever whereof one end bears against the guide rail at the corresponding side of the window frame and whereof the other end extends outward through an aperture in the sash frame for convenience of manipulation from the inner side of the window; and wherein the bearing end of each such lever has a separately-attached wear facing.

4. A window structure comprising a frame; lower and upper sashes slidably guided within the frame; releasable means allowing the lower sash to be displaced inwardly from its normal plane within the frame for the purposes of draftless ventilation; counterbalancing means and strand elements whereby the sash is suspended; and brackets on the inner face of the window frame at the sill for supporting the sash at its lower corners when the latter is displaced as aforesaid with the side rails of the sash bearing against the inner faces of the frame jambs.

5. A window structure according to claim 4, further comprising cooperative stop means to hold the displaced sash in a tilted position in opposition to the pull of the counterbalancing means when increased draftless ventilation is desired, said stop means having the form of pivoted elements which are swingable into openings in the rear faces of the jambs of the window frame so as to be normally out of the way, and when so swung form flush closures for such openings.

6. A window structure comprising a main frame with spaced guide tracks at the inner sides of the jambs; sliding upper and lower sashes with projecting side flanges; and U section metallic guide strips secured to the sash along the opposite side edges and respectively engaging over the tracks, said strips being the sole means whereby the sashes are held to the tracks, and each having a retroversion on one of its legs to embrace the edge of one of the projecting side flanges aforesaid at the corresponding side of the sash.

7. A window structure according to claim 6 wherein each such strip is secured by indentations into apertures at intervals along the corresponding sash flanges.

8. A window structure according to claim 6, wherein the hollows of the U strips are of such depth as to permit lateral shifting of the sash and subsequent manipulation of the same for convenience of their removal from within the main frame; and wherein retractable keepers on the sashes normally close portions of the strip hollows and engage the edges of the track rail to hold the sashes assembled with the main frame.

HENRY N. RENTON.